(12) United States Patent
Ichieda

(10) Patent No.: US 8,167,441 B2
(45) Date of Patent: May 1, 2012

(54) IMAGE DISPLAY SYSTEM AND IMAGE DISPLAY METHOD

(75) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 335 days.

(21) Appl. No.: 12/693,652

(22) Filed: Jan. 26, 2010

(65) Prior Publication Data

US 2010/0188549 A1     Jul. 29, 2010

(30) Foreign Application Priority Data

Jan. 27, 2009    (JP) ................................. 2009-015073

(51) Int. Cl.
*G03B 21/14*     (2006.01)
(52) U.S. Cl. ...... 353/122; 353/63; 353/121; 348/333.01
(58) Field of Classification Search .................. 353/119, 353/121, 122, 63, 65; 348/370, 373, 333.06, 348/333.01, 63; 355/44
See application file for complete search history.

(56) References Cited

U.S. PATENT DOCUMENTS

| | | | |
|---|---|---|---|
| 6,065,839 A * | 5/2000 | Miyata et al. ................. | 353/122 |
| 6,300,975 B1 * | 10/2001 | Yamane ......................... | 348/63 |
| 7,050,106 B2 * | 5/2006 | Nagano ......................... | 348/373 |
| 2002/0171757 A1 * | 11/2002 | Pilu ............................... | 348/373 |
| 2003/0202224 A1 * | 10/2003 | Moriya .......................... | 358/475 |
| 2006/0077286 A1 * | 4/2006 | Wenderski .................... | 348/373 |
| 2010/0188550 A1 * | 7/2010 | Ichieda ......................... | 348/333.01 |
| 2010/0188563 A1 * | 7/2010 | Ichieda ......................... | 348/373 |
| 2010/0188585 A1 * | 7/2010 | Ichieda ......................... | 348/708 |
| 2011/0205425 A1 * | 8/2011 | Duncan et al. ................ | 348/373 |

FOREIGN PATENT DOCUMENTS

JP     A-2004-104341     4/2009

* cited by examiner

*Primary Examiner* — William C Dowling
(74) *Attorney, Agent, or Firm* — Oliff & Berridge, PLC

(57) ABSTRACT

An image display system includes an image display apparatus and an image signal supply apparatus which are connected to each other via an interface and displaying an image based on an image signal supplied from the image signal supply apparatus on the image display apparatus, wherein the image signal supply apparatus includes: an imaging unit taking an image of a subject; a movable holding unit holding the imaging unit and having a first state and a second state other than the first state; a state detector detecting which state of the first state and the second state the movable holding unit has; and an image signal supply apparatus controller transmitting the image acquired by the imaging unit and the detection result of the state detector via the interface, and wherein the image display apparatus includes: a state detection result acquiring unit acquiring the detection result of the state detector transmitted from the image signal supply apparatus; and an image display apparatus controller displaying a predetermined image other than the image based on the image signal transmitted from the image signal supply apparatus when it is determined that the movable holding unit has the second state on the basis of the detection result acquired by the state detection result acquiring unit, and displaying the image based on the image signal transmitted from the image signal supply apparatus when it is determined that the movable holding unit has the first state on the basis of the detection result acquired by the state detection result acquiring unit.

10 Claims, 9 Drawing Sheets

IMAGE DISPLAY SYSTEM AND IMAGE DISPLAY METHOD

The entire disclosure of Japanese Patent Application No. 2009-015073 filed Jan. 27, 2009 is expressly incorporated by reference herein.

BACKGROUND

1. Technical Field

The present invention relates to an image display system having an image signal supply apparatus and an image display apparatus.

2. Related Art

In presentations and the like, generally, a projector and a document camera are effectively used to project an image taken by the document camera by the use of the projector. The projector or the document camera should be portable. The document camera includes a foldable arm as described in JP-A-2004-104341.

However, when the document camera is connected to the projector via a USB cable with the arm folded, an image imaged in the folded state and not desired by the user is projected onto a screen.

SUMMARY

An advantage of some aspects of the invention is to prevent an image not desired by a user from being displayed.

The invention can be embodied in the following aspects.

According to an aspect of the invention, there is provided an image display system including an image display apparatus and an image signal supply apparatus which are connected to each other via an interface and displaying an image based on an image signal supplied from the image signal supply apparatus on the image display apparatus. Here, the image signal supply apparatus includes an imaging unit taking an image of a subject, a movable holding unit holding the imaging unit and having a first state and a second state other than the first state, a state detector detecting which state of the first state and the second state the movable holding unit has, and an image signal supply apparatus controller transmitting the image acquired by the imaging unit and the detection result of the state detector via the interface. In addition, the image display apparatus includes a state detection result acquiring unit acquiring the detection result of the state detector transmitted from the image signal supply apparatus, and an image display apparatus controller displaying a predetermined image other than the image based on the image signal transmitted from the image signal supply apparatus when it is determined that the movable holding unit has the second state on the basis of the detection result acquired by the state detection result acquiring unit, and displaying the image based on the image signal transmitted from the image signal supply apparatus when it is determined that the movable holding unit has the first state on the basis of the detection result acquired by the state detection result acquiring unit.

In the image display system according to the aspect, a user can switch the movable holding unit between the first state and the second state by moving the movable holding unit of the image signal supply apparatus. The state of the movable holding unit is detected by the state detector. When it is determined that the movable holding unit has the second state, a predetermined image other than the image transmitted from the image signal supply apparatus is displayed by the image display apparatus controller. That is, since it is determined whether the image taken by the imaging unit should be displayed on the basis of the state of the movable holding unit, it is possible to provide an image display system which is very convenient to the user.

In the image display system, the image display apparatus controller may stop acquiring the image signal from the image signal supply apparatus and may then display the predetermined image, when it is determined that the movable holding unit has the second state.

According to this configuration, the acquiring of an image from the image signal supply apparatus is stopped when the movable holding unit has the second state. Accordingly, it is possible to reduce the overall power consumption of the system.

In the image display system, the predetermined image may be a monochromic image.

According to this configuration, when the movable holding unit of the image signal supply apparatus has the second state, the image display apparatus displays a monochromic image. Accordingly, it is possible to inform a user that the image display apparatus does not display an image based on the image signal from the image signal supply apparatus.

In the image display system, the predetermined image may be an image of a picture indicating a message for a user.

According to this configuration, the user can be informed of an action to be carried out by the user by the use of a message displayed on a screen.

In the image display system, the image signal supply apparatus may include a switch being subjected to a predetermined operation, and an input source switching instruction output controller outputting an instruction signal for causing the image display apparatus to switch an input source to the image display apparatus via the interface when the predetermined operation is performed on the switch. In addition, the image display apparatus may include an input source switching unit switching an input source of an image to be displayed, and a switching controller causing the input source switching unit to switch the input source when the instruction signal for switching the input source is received from the image signal supply apparatus via the interface.

According to this configuration, a function of switching the input source of the image display apparatus is given to the switch of the image signal supply apparatus. Accordingly, when the switch is operated by the user, the instruction signal for switching the input source is output to the image display apparatus by the input source switching instruction output controller, whereby the input source of the image displayed by the image display apparatus can be switched by the image signal supply apparatus. Therefore, in the image display system, the user does not need to move to a place in which the image display apparatus or a remote controller of the image display apparatus is located, whereby the user's operability is excellent. Particularly, even when the movable holding unit of the image signal supply apparatus has the second state, the input source can be switched by operating the switch, whereby the user's operability is more excellent.

In the image display system, the state detector may determine as the first state a state where the imaging unit held by the movable holding unit is fixed to a predetermined position, and may determine as the second state a state where the imaging unit is located at a position other than the predetermined position.

According to this configuration, the image signal supply apparatus transmits the state of the movable holding unit to the image display apparatus depending on the position of the imaging unit. Accordingly, the user of the image display system can select the image to be displayed on the image display apparatus by changing the position of the imaging unit of the image signal supply apparatus. That is, it is possible to switch the display state of the image display apparatus without switching the input source of the image display apparatus, whereby the convenience to the user is very excellent.

In the image display system, the image signal supply apparatus may be a document camera and the image display apparatus may be a projector.

According to this configuration, it is possible to simply capture an image of a subject such as an original document with the document camera and to project the imaged image by the projector.

The invention can be embodied in various forms such as an apparatus which is one of the image signal supply apparatus and the image display apparatus, a method for embodying the units of the image signal supply apparatus or the image display apparatus, an image display method, a computer program for embodying the units, a recording medium having recorded thereon the computer program, and data signals embodied by carrier waves including the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
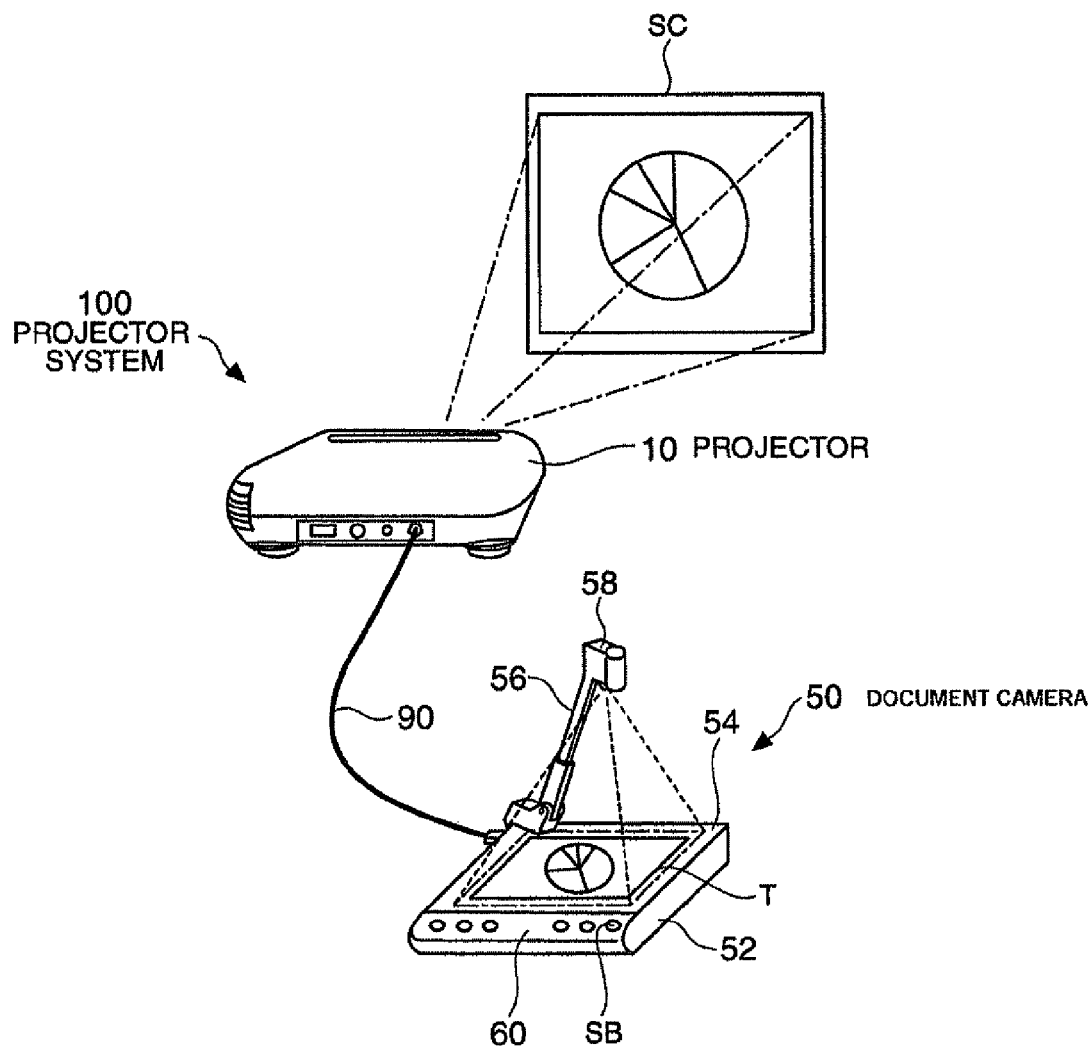
FIG. 1 is a diagram schematically illustrating a configuration of a projector system according to an embodiment of the invention.

Hereinafter, exemplary embodiments of the invention will be described with reference to the accompanying drawings.
1. Hardware Configuration FIG. 1 is a diagram schematically illustrating a projector system according to an embodiment of the invention. As shown in the drawing, the projector system 100 includes a projector 10 and a document camera 50 connected to the projector 10. The projector 10 and the document camera 50 are connected to each other via a USB cable 90. An image taken by the document camera 50 is displayed on (projected onto) a screen SC by the projector 10. Here, the image may be any of a still image and a moving image (that is, video). In this embodiment, the document camera 50 acquires a video.

Figure 2:
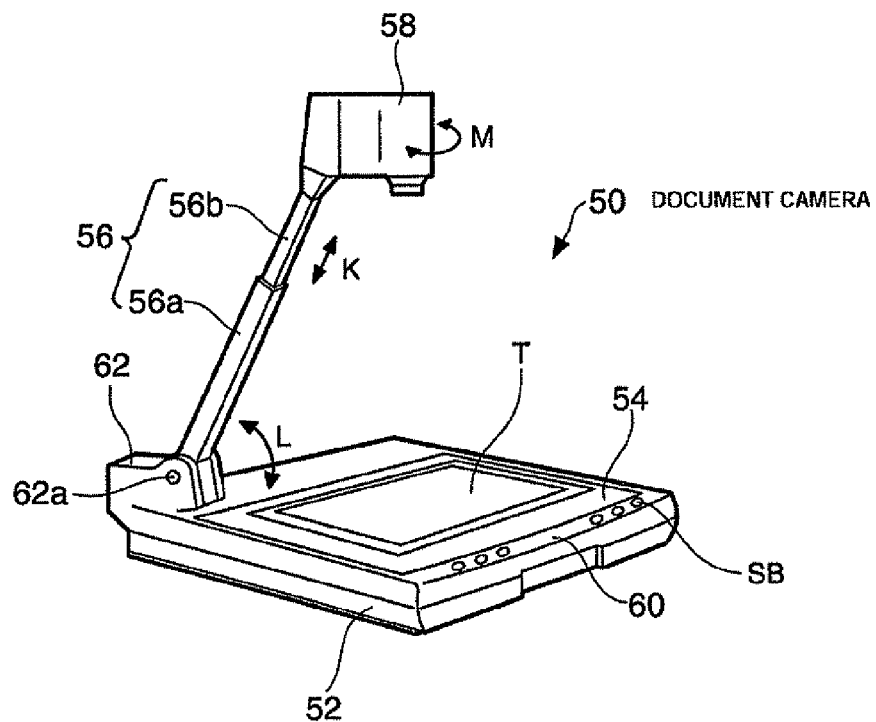
FIG. 2 is a perspective view illustrating a imaging state of a document camera.

FIG. 2 is a perspective view illustrating the document camera 50. As shown in the drawing, the document camera 50 includes a base member 52, a mounting plane 54, an arm 56, a camera head 58, and an operation panel 60. The mounting plane 54 is disposed on the base member 52 and a subject T such as a sheet of paper (original document) having characters or figures drawn thereon and a stereoscopic object is mounted thereon.

The arm 56 holds the camera head 58. The arm includes a lower arm 56a and an upper arm 56b. The lower arm 56a and the upper arm 56b are stretchable in an axis direction (the direction of K in the drawing). The lower arm 56a is attached to an arm attachment portion 62 disposed at one of four corners of the base member 4 so as to be rotatable about the rotation center of a rotation axis 62a in the direction of L in the drawing. The arm 56 corresponds to the "movable holding unit" in the claims.

The camera head 58 is connected to an end of the upper arm 56b. Specifically, the camera head 58 is connected to the upper arm 56b so as to be rotatable about the axis (in the direction of M in the drawing) of the upper arm 56b. The camera head 58 includes a lens, an LED, and a photoelectric converter such as a CCD. A user can fix the camera head 58 to a predetermined position suitable for taking an image of a subject T mounted on a mounting surface 54 by adjusting the rotational position in the directions of K, L, and M. In a state where the arm 56 is unfolded (first state), that is, in the state shown in FIG. 2, the subject T can be taken. This state is hereinafter referred to as "imaging state". The predetermined position is not limited to one position, but may be in a range in which the camera head 58 can be focused on the subject T.

The operation panel 60 includes plural buttons (button-type switches) and receives a user's operation instruction to the document camera 50.

Figure 3:
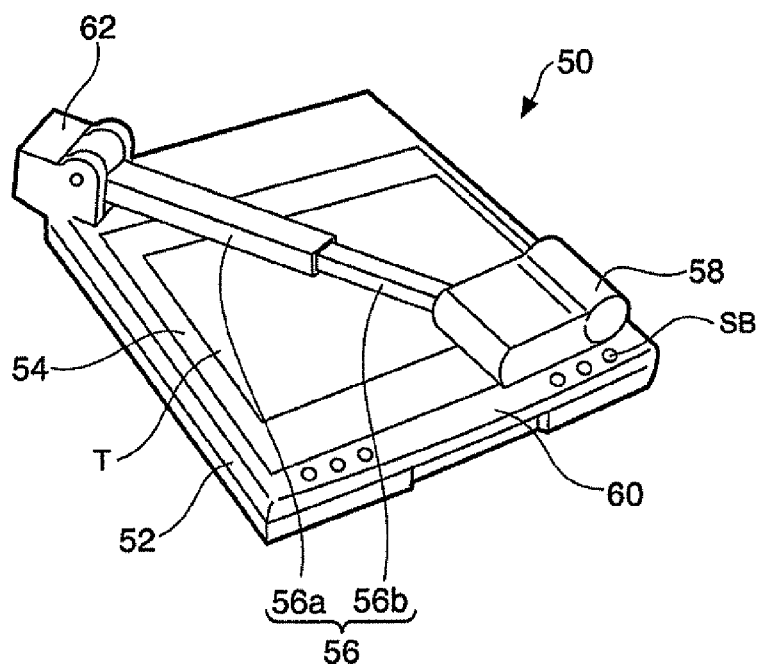
FIG. 3 is a perspective view illustrating a non-imaging state of the document camera.

In the document camera 50 according to this embodiment, as described above, since the rotational position in the directions of K, L, and M can be adjusted, the arm 56 and the camera head 58 can be folded from the imaging state shown in FIG. 2 to the state shown in FIG. 3. That is, in FIG. 2, the camera head 58 fixed to the predetermined position on the mounting plane 54 by the arm 56 is rotated in the direction of M in the drawing. Then, by pushing the upper arm 56b into the lower arm 56a (to the lower side in the direction of K in the drawing), the total length of the arm 56 is reduced. Subsequently, the arm 56 is fallen down to the lower side in the direction of L in the drawing. As a result, as shown in FIG. 3, the arm 56 and the camera head 58 in the document camera 50 can be folded (second state). This folded state is hereinafter referred to as "non-imaging state". In the non-imaging state, the arm 56 and the camera head 58 are fallen down and thus the height of the document camera 50 is reduced. The non-imaging state is not limited to the state where the arm 56 and the camera head 58 are completely folded, but may include a state where the camera head 58 departs from the predetermined position.

The document camera 50 having the above-mentioned configuration takes an image of the subject T mounted on the mounting plane 54 in the imaging state shown in FIG. 2 and outputs an image signal indicating the image acquired by the imaging operation to the projector 10. When the use of the document camera 50 is ended, the user folds and receives the arm 56 and the camera head 58 in the non-imaging state shown in FIG. 3.

Figure 4:
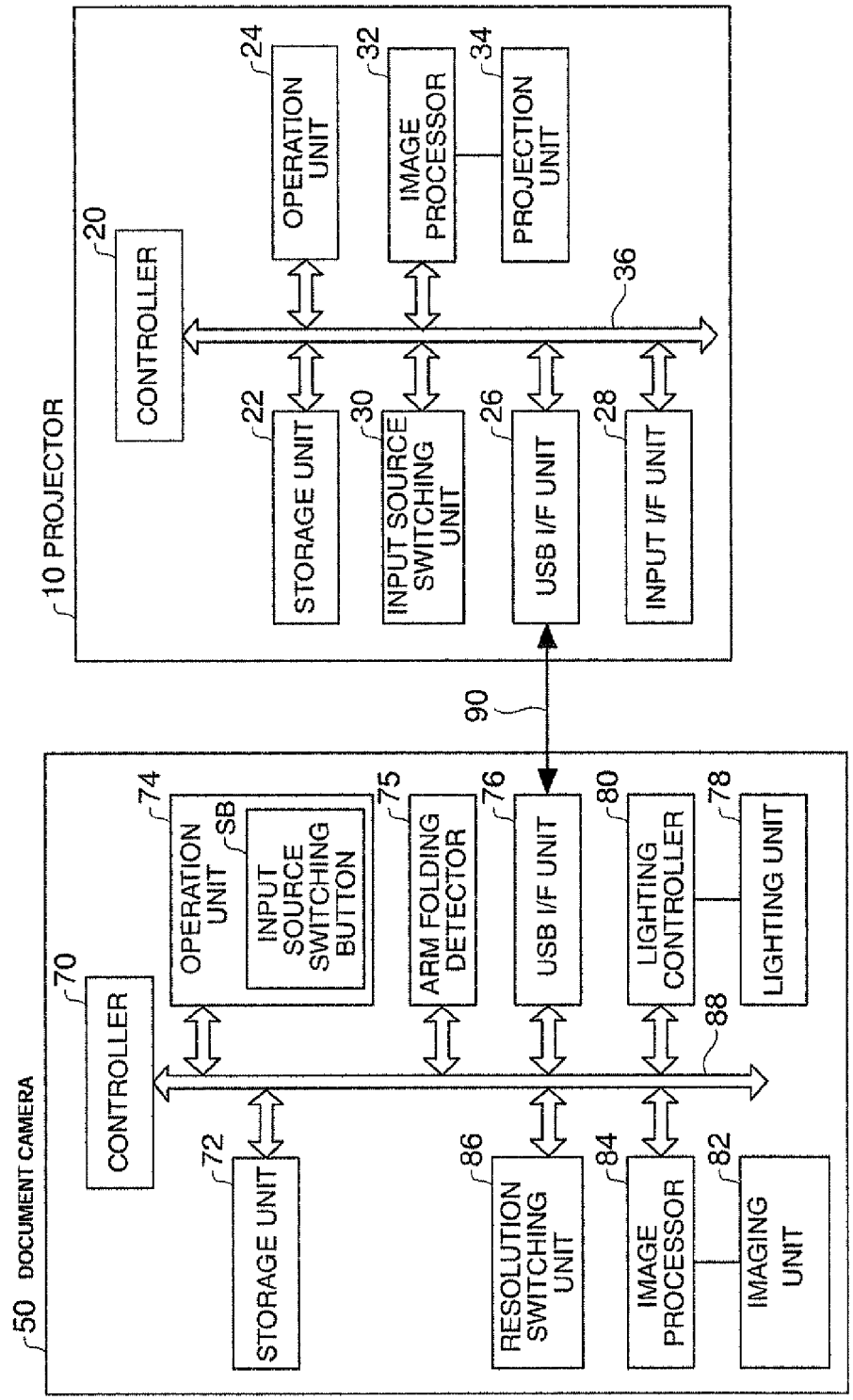
FIG. 4 is a diagram illustrating internal configurations of a projector and the document camera.

FIG. 4 is a diagram illustrating the internal configurations of the projector 10 and the document camera 50. As shown in the drawing, the projector 10 includes a controller 20, a storage unit 22, an operation unit 24, a USB interface unit 26, an input interface unit 28, an input source switching unit 30, an image processor 32, and a projection unit 34. Reference numeral 36 represents a bus which connects the controller 20 to the units 22 to 32 other than the projection unit 34.

The controller 20 is constructed by a CPU, a DSP (Digital Signal Processor), or the like and operates in accordance with computer programs stored in the storage unit 22 to control the units 22 to 32. The storage unit 22 stores image data or various computer programs. A known USB module, a USB video class driver, an image display program, and a program for a mute picture display switching process to be described later are stored as the computer programs.

The operation unit 24 serves to input an operation instruction from the user to the projector 10 and includes an operation panel (not shown) and a remote controller receiver (not shown). The operation panel and the remote controller are provided with an input source switching button (not shown) for switching an input source of an image to be displayed by the projector 10.

The USB interface unit 26 serves to transmit and receive control data or image data to and from an external device on the basis of an USB (Universal Serial Bus) standard. In this embodiment, the document camera is connected to the USB interface unit 26 via a USB cable 90.

The input interface unit 28 is an interface used to transmit and receive control data and image data to and from an external device other than the USB, and includes an RGB interface, a video interface, and an S-video interface. When the input interface unit 28 is used, connections to an image signal supply apparatus such as a personal computer, a video tape recorder (VTR), and a DVD player other than the document camera 50 can be made. Although not shown, it is assumed in the following description that the personal computer, the VTR, and the DVD player in addition to the document camera 50 are connected to the projector 10.

The input source switching unit 30 switches the input source of the image to be displayed by the projector 10 by selecting one interface out of the USB interface unit 26 and the interfaces included in the input interface unit 28.

Figure 11:
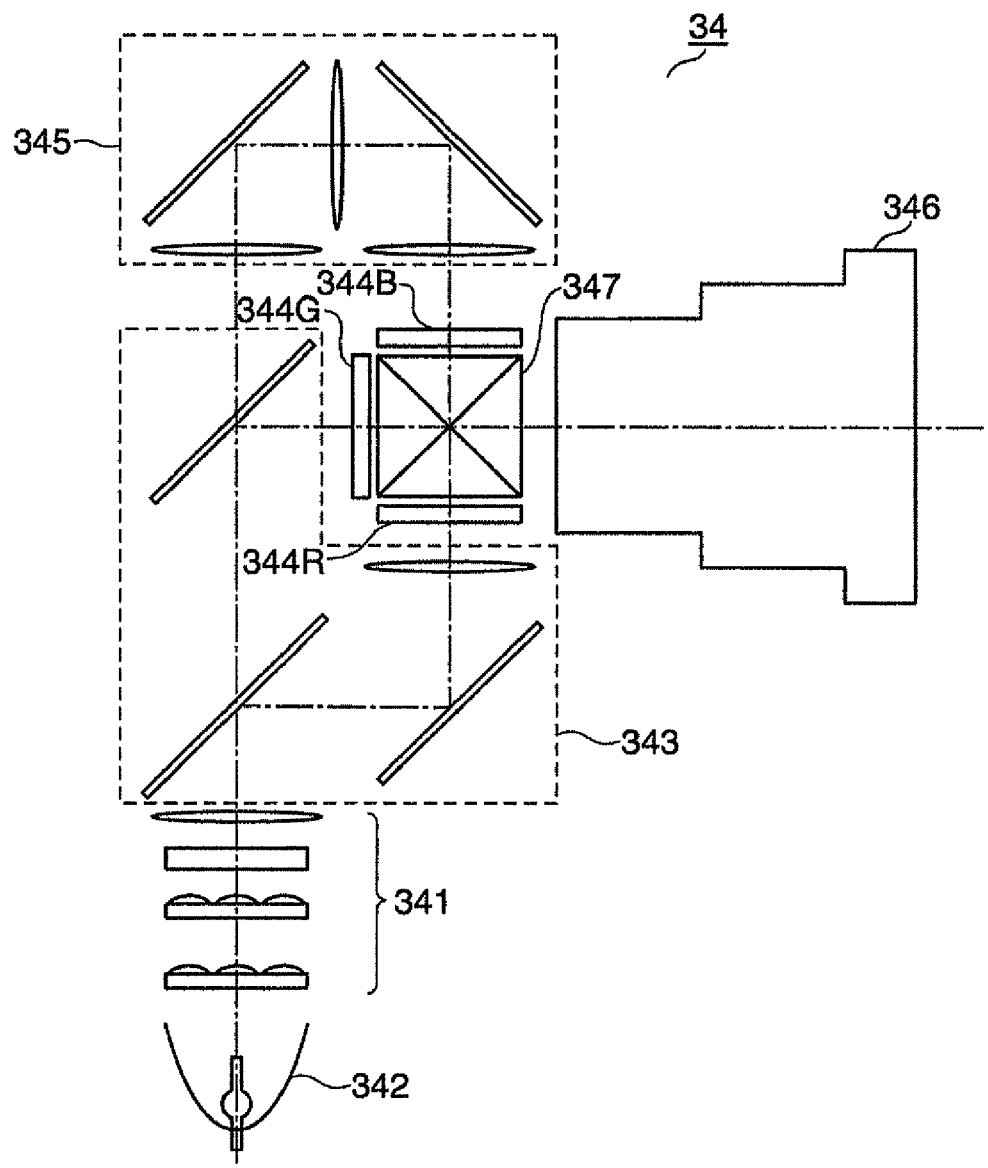
FIG. 11 is a diagram illustrating the internal configuration of a projection unit of the projector.

The image processor 32 generates display image data for image display on the basis of the image data or video data input from the interface selected by the input source switching unit 30. As shown in FIG. 11, the projection unit 34 includes a light source 342, light modulators 344 (344R, 344G, and 344B), a projection lens 346, a lighting optical system 341, a color separating optical system 343, a relay optical system 345, and a synthesis optical system 347. The projector 10 according to this embodiment includes a transmissive liquid crystal panel as the light modulators 344. White light emitted from the light source 342 is separated into a red beam, a green beam, and a blue beam while passing through the lighting optical system 341, the color separating optical system 343, and the relay optical system 345, and the separated beams are modulated by the light modulators 344 on the basis of the display image data generated by the image processor 32 and are incident on the synthesis optical system 347. The color image beams modulated by the light modulators 344 are synthesized by the synthesis optical system 347 and the synthesized image light is projected from the projection lens 346. The synthesis optical system 347 can be constructed by a dichroic prism or the like.

The document camera 50 includes a controller 70, a storage unit 72, an operation unit 74, an arm folding detector 75, a USB interface unit 76, a lighting unit 78, a lighting controller 80, an imaging unit 82, an image processor 84, and a resolution switching unit 86. Reference numeral 88 represents a bus which connects the controller 70 to the units 72 to 76, 80, 84, and 86 other than the lighting unit 78 and the imaging unit 82.

The controller 70 is constructed by a CPU or the like, and operates in accordance with computer programs stored in the storage unit 72 so as to control the units 70 to 86 included in the document camera 50. The storage unit 72 stores image data or various computer programs. Programs to be described later are stored as the computer programs.

The operation unit 74 serves to input an operation instruction from a user to the document camera and includes an operation panel 60 (see FIG. 1) disposed in the document camera 50. The operation unit includes an input source switching button SB. The input source switching button SB is disposed on the operation panel 60 (see FIGS. 1 to 3) and the function thereof will be described in detail later.

The arm folding detector 75 corresponding to the state detector in the claims is a switch built in the arm attachment portion 62 and detects which of the imaging state and the non-imaging state the lower arm 56a has. A mechanical type such as a push button or a non-contact type such as a magnetic sensor may be used in the detection. That is, as long as the arm folding detector 75 can detect in which of the imaging state and the non-imaging state the lower arm 56a is, any type of sensor may be used.

The arm folding detector 75 may detect the state where the upper arm 56b is most inserted into the lower arm 56a, that is, the state where the total length of the arm 56 is the minimum, instead of detecting the state of the lower arm 56a. In this case, it is detected that the arm 56 is in the non-imaging state from the state where the upper arm 56b is most inserted into the lower arm 56a. As long as the arm folding detector 75 can detect in which of the imaging state and the non-imaging state the arm 56 is, any configuration can be employed.

Referring to FIG. 4 again, the USB interface unit 76 serves to transmit and receive control data or image data to and from an external device in accordance with the USB standard. In this embodiment, the USB interface unit 76 is connected to the USB interface unit 26 of the projector 10 via the USB cable 90.

The lighting unit 78 includes a light source such as an LED emitting light to the subject T. The lighting controller 80 controls the turning-on and turning-off of the lighting unit 78. The imaging unit 82 includes a photoelectric converter such as a CCD and a driving unit controlling an AE (automatic exposure)/AF (automatic focus) control operation. The imaging unit 82 is built in the camera head 58 (see FIG. 1). The image processor 84 performs an image process such as white balancing on the image signal corresponding to the image taken by the imaging unit 82. The resolution switching unit 86 switches the resolution of the image taken by the imaging unit 82 into a resolution requested by the projector 10. The request of the projector 10 is sent from the projector 10 via the USB I/F unit 76.

The document camera 50 is supplied with power from the projector 10 via a USB cable 70. The supply of power is made via the power supply line of the USB cable 70.

The projector 10 and the document camera 50 having the above-mentioned configurations operate as follows to display an image of the subject T (see FIG. 1). That is, when the operation unit 74 of the document camera 50 is operated, the controller 70 controls the lighting controller 80, the image processor 84, and the resolution switching unit 86 to take an image of the subject T mounted on the mounting plane 54 (see FIG. 1), and temporarily stores the image signal (image data) acquired by the imaging in the storage unit 72. Thereafter, the controller 70 transmits the image signal stored in the storage unit 72 to the projector 10 via the USB I/F unit 76.

In the projector 10, the controller 20 receives the image signal transmitted from the document camera 50 via the USB I/F unit 26 and controls the image processor 32 to generate the display image data on the basis of the received image signal. As a result, a projection beam modulated on the basis of the display image data is projected by the projection unit 34. Finally, the image of the subject T is displayed on the screen SC (see FIG. 1).

The image acquired by the document camera 50 is displayed when the arm 56 of the document camera 50 is in the imaging state, and the projector 10 switches the display to an AV mute picture when the arm 56 is in the non-imaging state. Hereinafter, the mute picture display switching process will be described in detail.

2. Software Configuration

Figure 5:
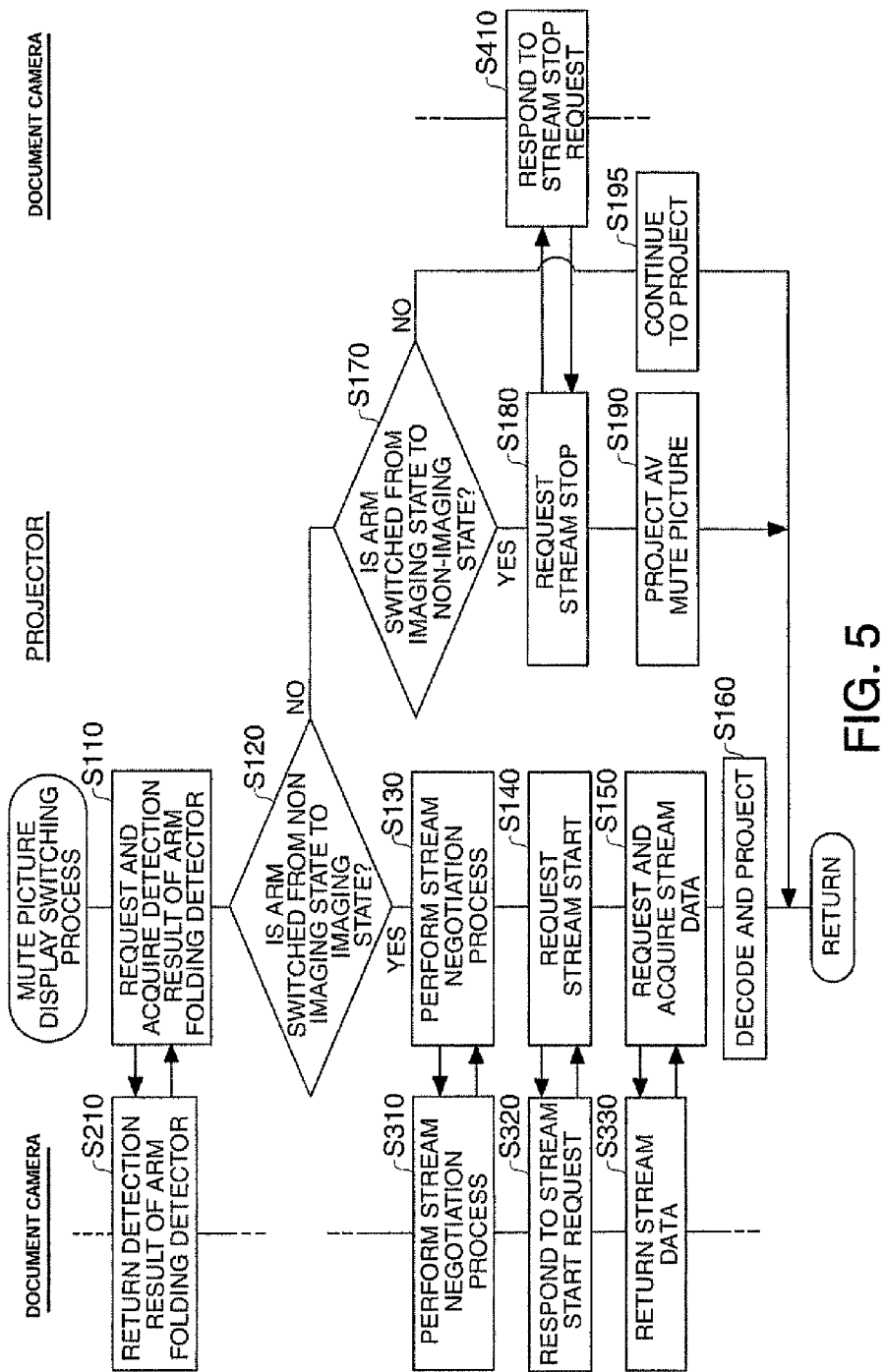
FIG. 5 is a flowchart illustrating a flow of a mute picture display switching process performed by the projector and a process performed by the document camera in response to the mute picture display switching process.

FIG. 5 is a flowchart illustrating a mute picture display switching process. The mute picture display switching process performed by the controller 20 of the projector 10 is repeatedly performed every predetermined time. In the drawing, a process performed by the controller 70 of the document camera 50 along with the mute picture display switching process is also shown.

When the process is started, the controller 20 of the projector 10 (hereinafter, referred to as "projector controller") requests the detection result of the arm folding detector 75 from the document camera 50 (step S110). The controller 70 of the document camera 50 receives a detection signal from the arm folding detector 75 every predetermined time in a routine not shown, and stores the detection result indicated by the detection signal, that in which of the imaging state and the non-imaging state the arm 56 is, in the storage unit 72. When the request for the detection result is received from the projector 10, the controller 70 of the document camera 50 (hereinafter, referred to as "document camera controller") performs a response process of sending the detection result to the projector 10 (step S210). The projector controller 20 acquires the detection result sent in step S110.

The projector controller 20 determines whether the arm 56 is switched from the non-imaging state to the imaging state (step S120). Here, when it is determined that the arm 56 is switched so, the projector controller performs a stream negotiation process in step S130. The stream negotiation process is a process of setting the projector 10 on the basis of a configuration descriptor acquired when the USB connection is established in a routine not shown. The document camera controller 70 similarly performs the stream negotiation process in cooperation with the projector controller 20 (step S310). The processes of steps S130 and S310 serve to determine the conditions for transmitting a video stream (image data), such as a frame resolution, a frame format, and the maximum payload size.

The projector controller 20 transmits a start request for image data, which is a video stream, to the document camera 50 after performing the process of step S130 (step S140). When the start request is received, the document camera controller 70 starts a process of causing the imaging unit 82 to acquire image data and transmitting the image data to the projector 10 (step S320).

Thereafter, the projector controller 20 requests image data from the document camera 50 (step S150), and the document camera controller 70 divides the acquired image data in the unit of payload and transmits (returns) the divided image data to the projector 10 in response to the request (step S330). The projector controller 20 acquires the image data transmitted from the document camera 50 in step S150. The projector controller 20 decodes the image data in the unit of payload received from the document camera 50 and projects the decoded image data as the display image data (step S160). After performing the process of step S160, the mute picture display switching process is temporarily ended by "return".

On the other hand, the projector controller 20 determines whether the arm 56 is switched from the imaging state to the non-imaging state in step S170, when it is determined in step S120 that the arm 56 is not switched from the non-imaging state to the imaging state. Here, when it is determined that the arm is switched, the projector controller 20 transmits a stop request for a video stream to the document camera 50 in step S180.

When the stop request is received from the projector 10, the document camera controller 70 stops the imaging process of the imaging unit 82 and stops the process of transmitting payload data to the projector 10 (step S410).

The projector controller 20 performs a process of projecting an AV mute picture (step S190) after performing the process of step S180. Here, a picture of a black background is projected as the AV mute picture.

Figure 6:
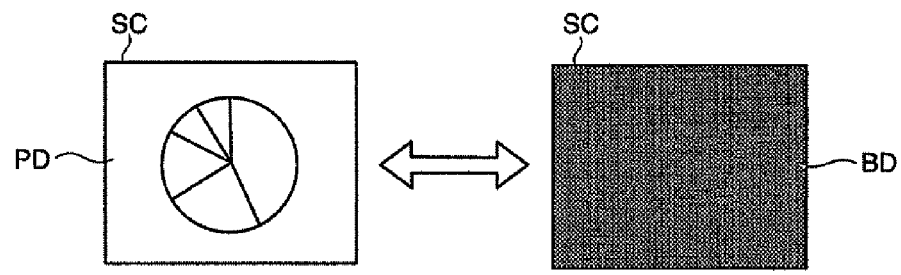
FIG. 6 is a diagram illustrating an AV mute picture.

FIG. 6 is a diagram illustrating the AV mute picture. The right side in the drawing indicates the AV mute picture. As shown in the drawing, a black background BD with only a black color is projected onto the screen SC. As a result, as shown in FIG. 6, the image projected onto the screen SC is switched between the image data PD acquired by the imaging unit 82 and the AV mute picture with the black background BD. The AV mute picture may be a monochromic image with a single color such as a blue background instead of the black background. The AV mute picture is not limited to the monochromic image, but may be a multi-color image. As long as it is an image different from the stream transmitted from the document camera 50, any image may be employed.

The image of the AV mute picture corresponds to the "predetermined image" in the claims. Instead of the AV mute picture, a user guide picture may be employed as the predetermined image and the image of the user guide picture may be projected in step S190.

Figure 7:
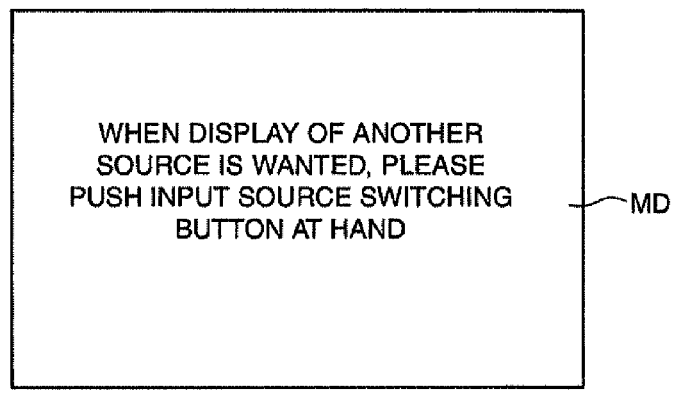
FIG. 7 is a diagram illustrating a user guide picture.

FIG. 7 is a diagram illustrating an example of the user guide picture. As shown in the drawing, the user guide picture includes an image MD indicating a message for a user. An example of the message is "WHEN DISPLAY OF ANOTHER SOURCE IS WANTED, PLEASE PUSH INPUT SOURCE SWITCHING BUTTON", as shown in the drawing. Accordingly, it is possible to urge the user of the document camera 50 to push the input source switching button SB.

Referring to FIG. 5 again, when the AV mute picture is projected in step S190, the mute picture display switching process is temporarily ended by "return". On the other hand, when a negative determination result is obtained in step S170, that is, when it is determined that the arm is not switched from the non-imaging state to the imaging state nor switched from the imaging state to the non-imaging state, it is continued to project the imaging state or the non-imaging state (step S195). That is, when the arm 56 is in the imaging state, the image data acquired by the imaging unit 82 is projected. When the arm 56 is in the non-imaging state, the AV mute picture is projected. After performing the process of step S195, the mute picture display switching process is temporarily ended by "return".

According to the mute picture display switching process having the above-mentioned configuration, when the arm 56 is switched from the non-imaging state to the imaging state, the projection of the image data acquired by the imaging unit 82 of the document camera 50 onto the screen SC is started. When the arm 56 is switched from the imaging state to the non-imaging state, the acquisition of the image data from the document camera 50 is stopped and the AV mute picture is then projected onto the screen SC.

Figure 8:
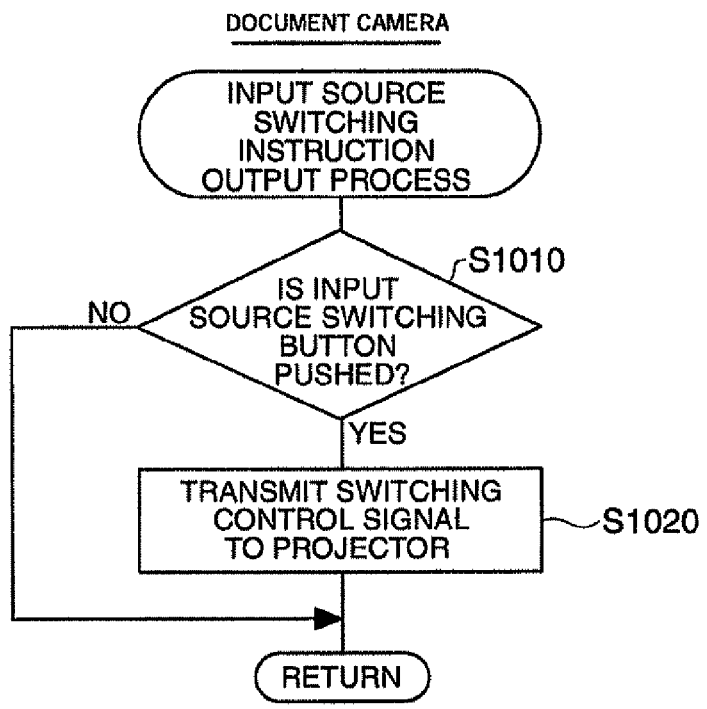
FIG. 8 is a flowchart illustrating an input source switching instruction output process performed by the document camera.

FIG. 8 is a flowchart illustrating an input source switching instruction output process performed by the controller 70 of the document camera 50. The input source switching instruction output process is repeatedly performed every predetermined time and is performed when the arm 56 is in one of the non-imaging state and the imaging state. As shown in the drawing, when the flow of processes is started, the controller 70 determines whether the input source switching button SB disposed in the operation panel 60 is pushed (step S1010). When it is determined that the input source switching button SB is pushed, the controller 70 transmits an instruction signal (hereinafter, referred to as "input source switching instruction signal") instructing to switch the input source to the projector 10 via the USB I/F unit 76 (step S1020). Specifically, the document camera 50 transmits button IDs of various buttons and events of pushing and releasing the buttons to the projector 10 as the input source switching instruction signal.

The input source switching instruction signal is transmitted from the USB I/F unit 76 by the "control transmission" or the "interrupt transmission" of the USB communication control. That is, by temporarily storing data representing the input source switching button SB is pushed in the storage unit 72 and receiving the data from the projector 10 via the USB I/F unit 26, the transmission of the input source switching instruction signal is carried out. In other words, the data representing that the input source switching button SB is pushed is transmitted as the input source switching instruction signal.

After the process of step S1020 is performed, the input source switching instruction output process is temporarily ended by "return". On the other hand, when it is determined in step S1010 that the input source switching button SB is not pushed, the input source switching instruction output process is temporarily ended by "return".

Figure 9:
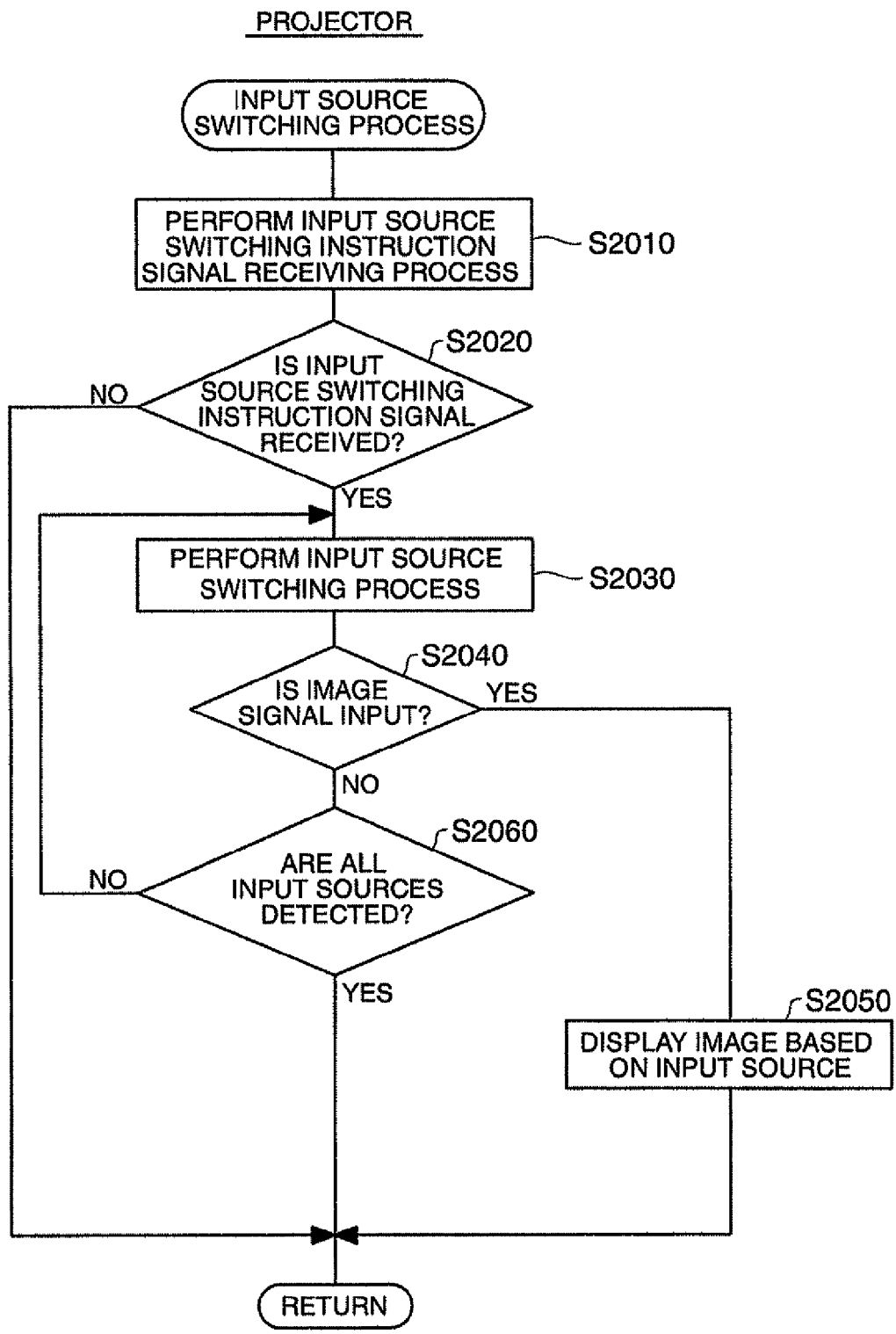
FIG. 9 is a flowchart illustrating an input source switching process performed by the projector.

FIG. 9 is a flowchart illustrating an input source switching process performed by the controller 20 of the projector 10. The input source switching process is repeatedly performed every predetermined time. As shown in the drawing, when the flow of processes is started, the controller 20 performs a process of receiving the input source switching instruction signal sent from the document camera 50 (step S2010). Here, when the input source switching instruction signal is not sent from the document camera 50 and it fails to receive the signal, a negative determination is made in step S2020, that is, it is determined that the input source switching instruction signal is not received, and the input source switching process is temporarily ended by "return".

On the other hand, when the input source switching instruction signal is received successfully and it is determined in step S2020 that the input source switching instruction signal exists, the controller 20 activates the input source switching unit 30 to perform the input source switching process of switching the displayed input source to the next one (step S2030).

In the projector 10, as described above, plural image signal supply apparatuses in addition to the document camera 50 can be connected thereto and the plural image signal supply apparatuses can be selected as the input source to which priority is given. For example, the priority has an order of "computer"->"video"->"S-video"->"camera". The input source switching unit 30 performs a process of switching the input source to an input source having the next priority.

Thereafter, the controller 20 determines whether the image signal is input from the input source switched in step S2030 (step S2040). Here, when it is determined that the image signal is input, the controller 20 activates the image processor 32 to perform an image display based on the input source (step S2050).

On the other hand, when it is determined in step S2040 that the image signal is not input from the input source, the controller 20 determines whether all the input sources are detected in step S2060. Here, when it is determined that all the input sources are not detected, the input source is switched to the next one again in step S2030.

Figure 10:
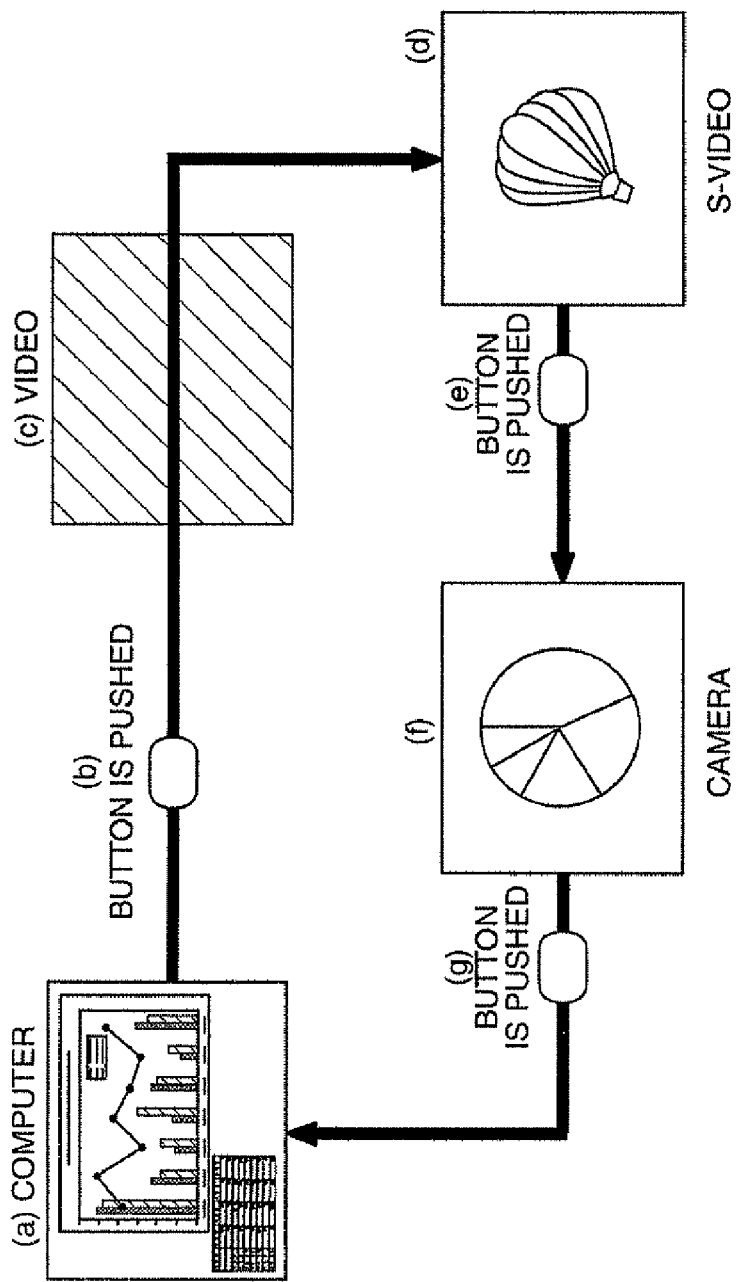
FIG. 10 is a diagram illustrating an example of the switching of an input source which is performed in the repeated processes of steps S2030 to S2060.

FIG. 10 is a diagram illustrating an example of the switching of the input source which is performed in the repeated processes of steps S2030 to S2060. When an image based on the input source of the "computer" is displayed as shown in (a) of the drawing and the input source switching button SB is pushed in this state as shown in (b) of the drawing, the input source is switched to the next "video" (step S2030) as shown in (c) of the drawing. However, when an image signal is not input from the VTR as the "video" (NO in step S2040), the input source is switched to the next "S-video" (step S2030) as shown in (d) of the drawing. Here, when an image signal is input from the DVD player as the "S-video" (Yes in step S2040), an image based on the DVD player is displayed (step S2050).

As shown in (e) of FIG. 10, when the input source switching button SB is pushed once more, the input source is switched to the next "camera". When an image signal is input from the document camera 50 as the "camera", an image based on the document camera 50 is displayed (step S2050) as shown in (f) of the drawing. When the input source switching button SB is pushed once more as shown in (g) of the drawing, the input source is switched to the "computer" having the superior priority. When an image signal is input from the personal computer as the "computer", an image based on the personal computer is displayed (step S2050) as shown in (a) of the drawing.

When the arm 56 of the document camera 50 is in the non-imaging state, the AV mute picture is displayed and an image signal from the document camera 50 is not input. Accordingly, the picture shown in (f) of FIG. 10 is removed and the input source is switched to the next "computer".

Referring to FIG. 9 again, when it is determined that all the input sources are detected after the process of step S2050 or in step S2060, the input source switching process is temporarily ended by "return".

According to the input source switching process having the above-mentioned configuration, it is possible to switch the input source displayed by the projector 10 by pushing the input source switching button SB of the document camera 50. Even when the arm 56 of the document camera 50 is in the non-imaging state, it is possible to switch the input source displayed by the projector 10 by pushing the input source switching button SB.

3. Operations and Advantages

In the projector system 100 according to this embodiment having the above-mentioned configuration, a user can switch the arm 56 between the imaging state and the non-imaging state by moving the arm 56 of the document camera 50. The arm folding detector 75 detects the state of the arm 56 and the AV mute picture is projected by the controller 70 when it is determined that the arm is in the non-imaging state. Accordingly, when the arm 56 is folded and is in the non-imaging state, the image taken by the document camera 50 is not transmitted to the projector 10, thereby preventing an image not desired by the user from being displayed.

When the arm 56 is folded, the stream from the document camera 50 is stopped, thereby suppressing the power consumption of the system as a whole.

In the projector system 100 according to this embodiment, it is possible to switch the input source displayed by the projector 10 by pushing the input source switching button SB of the document camera 50. Accordingly, the user can switch the displayed input source without moving to a place in which the projector or the projector remote controller is located. As a result, it is possible to improve the user's operability. Particularly, even when the arm 56 of the document camera 50 is in the non-imaging state, it is possible to switch the input source by pushing the input source switching button SB, thereby further improving the user's operability.

In this embodiment, by switching the displayed input source one by one whenever the input source switching button SB of the document camera 50 is pushed, it is possible to cause the user to sequentially view the pictures of the switched input sources. Accordingly, the user does not make a mistake of erroneously switching the input source. Incidentally, in this embodiment, even when the input source switching button SB is pushed, an input source from which the image signal is not input is skipped, thereby fast displaying a desired image.

4. MODIFIED EXAMPLES

The invention is not limited to the above-mentioned embodiment or the modified examples thereof, but may be modified in various forms without departing from the spirit and scope of the invention. For example, the following modified examples can be employed.

(1) Although it has been described in the above-mentioned embodiment that the arm 56 of the document camera 50 can rotate at a connection position to the arm attachment portion 62 and can vary in length and be folded, the invention is not limited to this configuration. As long as the arm can be folded from the imaging state where an image of a subject can be taken, any configuration may be employed. For example, the arm may be constructed by a two-jointed robot which can rotate at two positions of a portion attached to the base member and a central portion in the longitudinal direction.

(2) Although it has been described in the above-mentioned embodiment that the projector 10 transmits a stream stop request to the document camera 50 and then displays the AV mute picture when the arm of the document camera 50 is in the non-imaging state, the stream stop request may not be transmitted. That is, the projector 10 may be configured to display the AV mute picture in the state where the stream is being transmitted from the document camera 50.

(3) Although it has been described in the above-mentioned embodiment that the input source switching button SB is one of the button-type switches disposed in the operation panel 60, the input source switching button is not limited to the button-type switch, but may be of any type as long as it can be operated by the user. The switch need not be disposed in the operation panel 60 and may be disposed at another position of the document camera 50. The input source switching button SB may be disposed in the remote controller for the document camera. The input source switching button SB is not necessary, and thus the configuration in which the input source switching button SB is removed is not excluded.

(4) Although it has been described in the above-mentioned embodiment that the document camera 50 is used as the image signal supply apparatus, another image signal supply apparatus such as a web camera, a digital still camera, and a video camera having an imaging unit may be employed.

(5) Although the projector 10 including the transmissive liquid crystal panels as the light modulators 344 has been exemplified as the image display apparatus in the above-mentioned embodiment, a reflective liquid crystal panel or a micro mirror device may be employed as the light modulators 344. Although it has been described in the above-mentioned embodiment that the projector 10 employing three light modulators 344 is employed, the number of light modulators 344 is not limited to three. For example, a rotating color wheel may be disposed in the lighting optical system 341 and the color image light may be generated in a time divisional manner using a single light modulator 344. Four or more light modulators 344 may be employed.

(6) Although the projector 10 projecting an image on an external screen SC is used as the image display apparatus in the above-mentioned embodiment, a projection television including a screen and a projector projecting an image to the back surface of the screen may be employed instead. Not limited to the projector, various image display apparatuses such as various direct-viewing flat panel display apparatuses may be employed.

(7) Although it has been described in the above-mentioned embodiment that the projector 10 and the document camera 50 are connected to each other by a USB cable, they may be connected by another wire such as a LAN. Not limited to the wired connection, a wireless connection using an USE or a LAN may be employed.

(8) Some elements embodied by hardware in the above-mentioned embodiment may be replaced with software. On the contrary, some elements embodied by software may be replaced with hardware.

What is claimed is:

1. An image display system comprising an image display apparatus and an image signal supply apparatus which are connected to each other via an interface and displaying an image based on an image signal supplied from the image signal supply apparatus on the image display apparatus,
   wherein the image signal supply apparatus includes:
      an imaging unit taking an image of a subject;
      a movable holding unit holding the imaging unit and having a first state and a second state other than the first state;
      a state detector detecting which state of the first state and the second state the movable holding unit has; and
      an image signal supply apparatus controller transmitting the image acquired by the imaging unit and the detection result of the state detector via the interface, and
   wherein the image display apparatus includes:
      a state detection result acquiring unit acquiring the detection result of the state detector transmitted from the image signal supply apparatus; and
      an image display apparatus controller displaying a predetermined image other than the image based on the image signal transmitted from the image signal supply apparatus when it is determined that the movable holding unit has the second state on the basis of the detection result acquired by the state detection result acquiring unit, and displaying the image based on the image signal transmitted from the image signal supply apparatus when it is determined that the movable holding unit has the first state on the basis of the detection result acquired by the state detection result acquiring unit.

2. The image display system according to claim 1, wherein the image display apparatus controller stops acquiring the image signal from the image signal supply apparatus and displays the predetermined image, when it is determined that the movable holding unit has the second state.

3. The image display system according to claim 1, wherein the predetermined image is a monochromic image.

4. The image display system according to claim 1, wherein the predetermined image is an image of a picture indicating a message for a user.

5. The image display system according to claim 1, wherein the image signal supply apparatus includes
a switch being subjected to a predetermined operation, and
an input source switching instruction output controller outputting an instruction signal for causing the image display apparatus to switch an input source to the image display apparatus via the interface when the predetermined operation is performed on the switch, and
wherein the image display apparatus includes
an input source switching unit switching an input source of an image to be displayed, and
a switching controller causing the input source switching unit to switch the input source when the instruction signal for switching the input source is received from the image signal supply apparatus via the interface.

6. The image display system according to claim 1, wherein the state detector determines as the first state a state where the imaging unit held by the movable holding unit is fixed to a predetermined position and determines as the second state a state where the imaging unit is located at a position other than the predetermined position.

7. The image display system according to claim 1, wherein the image signal supply apparatus is a document camera and the image display apparatus is a projector.

8. An image display method in an image display system comprising an image signal supply apparatus having an imaging unit and an image display apparatus which are connected to each other via an interface and displaying an image based on an image signal supplied from the image signal supply apparatus on the image display apparatus, the image display method causing the image signal supply apparatus to perform:
preparing a movable holding unit holding the imaging unit and having a first state and a second state other than the first state;
preparing a state detector detecting which state of the first state and the second state the movable holding unit has; and
transmitting the image acquired by the imaging unit and the detection result of the state detector via the interface, and
the image display method causing the image display apparatus to perform:
preparing a state detection result acquiring unit acquiring the detection result of the state detector transmitted from the image signal supply apparatus; and
displaying a predetermined image other than the image based on the image signal transmitted from the image signal supply apparatus when it is determined that the movable holding unit has the second state on the basis of the detection result acquired by the state detection result acquiring unit, and displaying the image based on the image signal transmitted from the image signal supply apparatus when it is determined that the movable holding unit has the first state on the basis of the detection result acquired by the state detection result acquiring unit.

9. The image display method according to claim 8, further causing the image display apparatus to perform stopping of image signal acquisition from the image signal supply apparatus and displaying the predetermined image, when it is determined that the movable holding unit has the second state.

10. The image display method according to claim 8, further causing the image signal supply apparatus to perform:
preparing a switch being subjected to a predetermined operation; and
outputting an instruction signal for causing the image display apparatus to switch an input source to the image display apparatus via the interface when the predetermined operation is performed on the switch, and
further causing the image display apparatus to perform:
preparing an input source switching unit switching an input source of an image to be displayed; and
causing the input source switching unit to switch the input operation when the instruction signal for switching the input source is received from the image signal supply apparatus via the interface.

* * * * *